No. 681,000. Patented Aug. 20, 1901.
H. N. NORTON.
MACHINE FOR SOLDERING BAIL EARS ON BODIES OF CANS OR OTHER VESSELS.
(Application filed Oct. 22, 1900.)
(No Model.) 4 Sheets—Sheet 1.

No. 681,000. Patented Aug. 20, 1901.
H. N. NORTON.
MACHINE FOR SOLDERING BAIL EARS ON BODIES OF CANS OR OTHER VESSELS.
(Application filed Oct. 22, 1900.)
(No Model.) 4 Sheets—Sheet 4.

WITNESSES:
F. B. Townsend
H. W. Munday

Horatio N. Norton
INVENTOR.
BY Munday, Evarts & Adcock
His ATTORNEYS.

UNITED STATES PATENT OFFICE.

HORATIO N. NORTON, OF MAYWOOD, ILLINOIS, ASSIGNOR, BY MESNE ASSIGNMENTS, TO THE AMERICAN CAN COMPANY, OF JERSEY CITY, NEW JERSEY.

MACHINE FOR SOLDERING BAIL-EARS ON BODIES OF CANS OR OTHER VESSELS.

SPECIFICATION forming part of Letters Patent No. 681,000, dated August 20, 1901.

Application filed October 22, 1900. Serial No. 33,927. (No model.)

*To all whom it may concern:*

Be it known that I, HORATIO N. NORTON, a citizen of the United States, residing in Maywood, in the county of Cook and State of Illinois, have invented a new and useful Improvement in Machines for Soldering Bail-Ears on Bodies of Cans or other Vessels, of which the following is a specification.

This invention relates to soldering bail-ears on the bodies of cans, pails, or other vessels.

Heretofore bail-ears have generally been soldered by hand on can-bodies, pails, and other vessels. The object of this invention is to provide an automatic machine of a simple, efficient, and durable construction, by means of which bail-ears may be rapidly and cheaply soldered in place; and it consists in the combination, with a movable table or carrier provided with a series of blank-holders for holding the flat sheet-metal body-blanks upon which the bail-ears are to be soldered, of a series of ear clamping or holding rods mounted on the carrier, a stationary cam or track for raising and lowering the ear-clamping rods, a series of rotary annular soldering tools or irons mounted on the carrier, a stationary cam or track for raising and lowering said soldering-tools, gears for rotating said tools, burners for heating the soldering-tools, and cooling devices for cooling the soldered seams uniting the bail-ears to the flat body-blanks.

It also consists in the novel construction of parts and devices and in the novel combinations of parts and devices herein shown and described, and specified in the claims.

Figure 1:
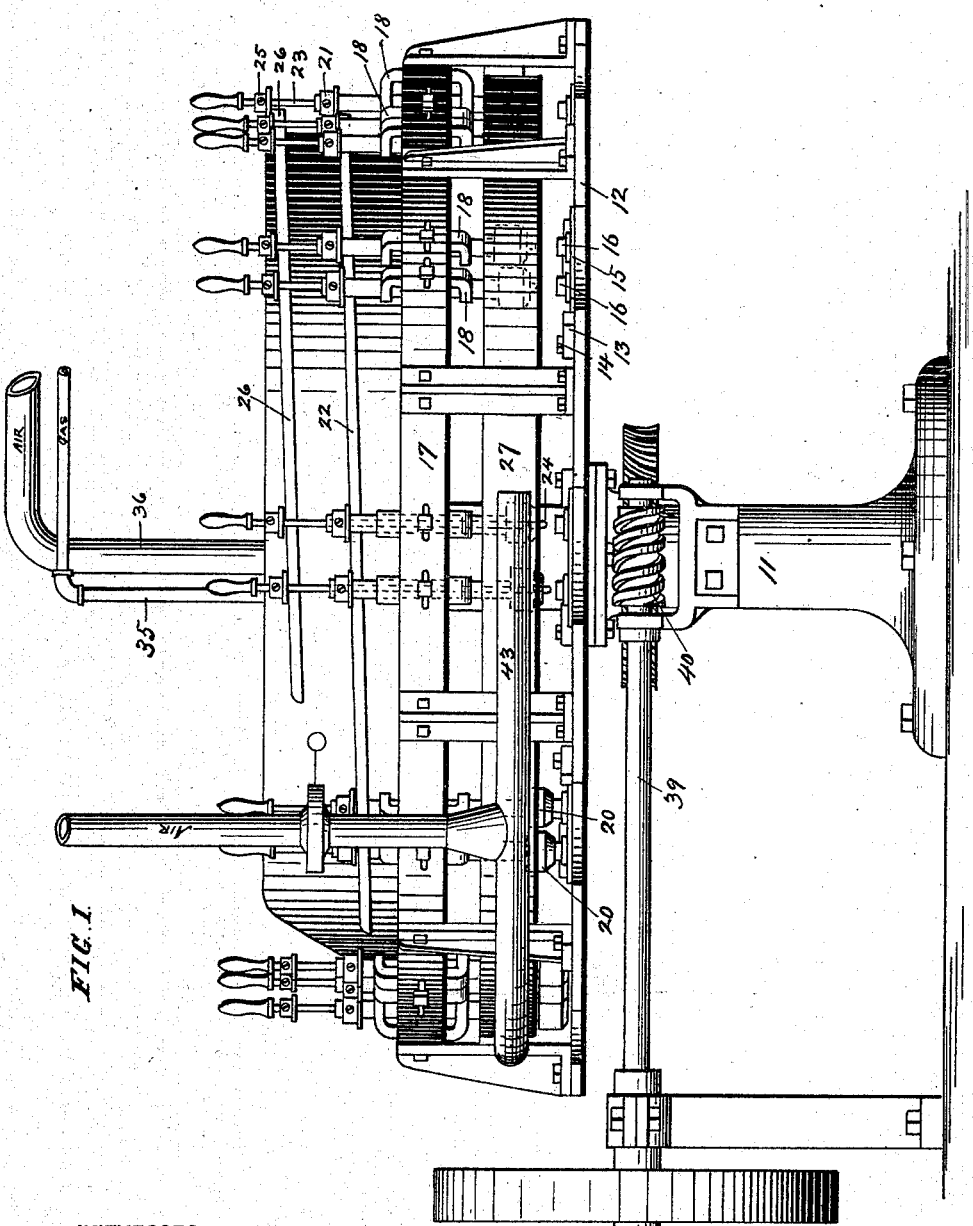
Figure 2:
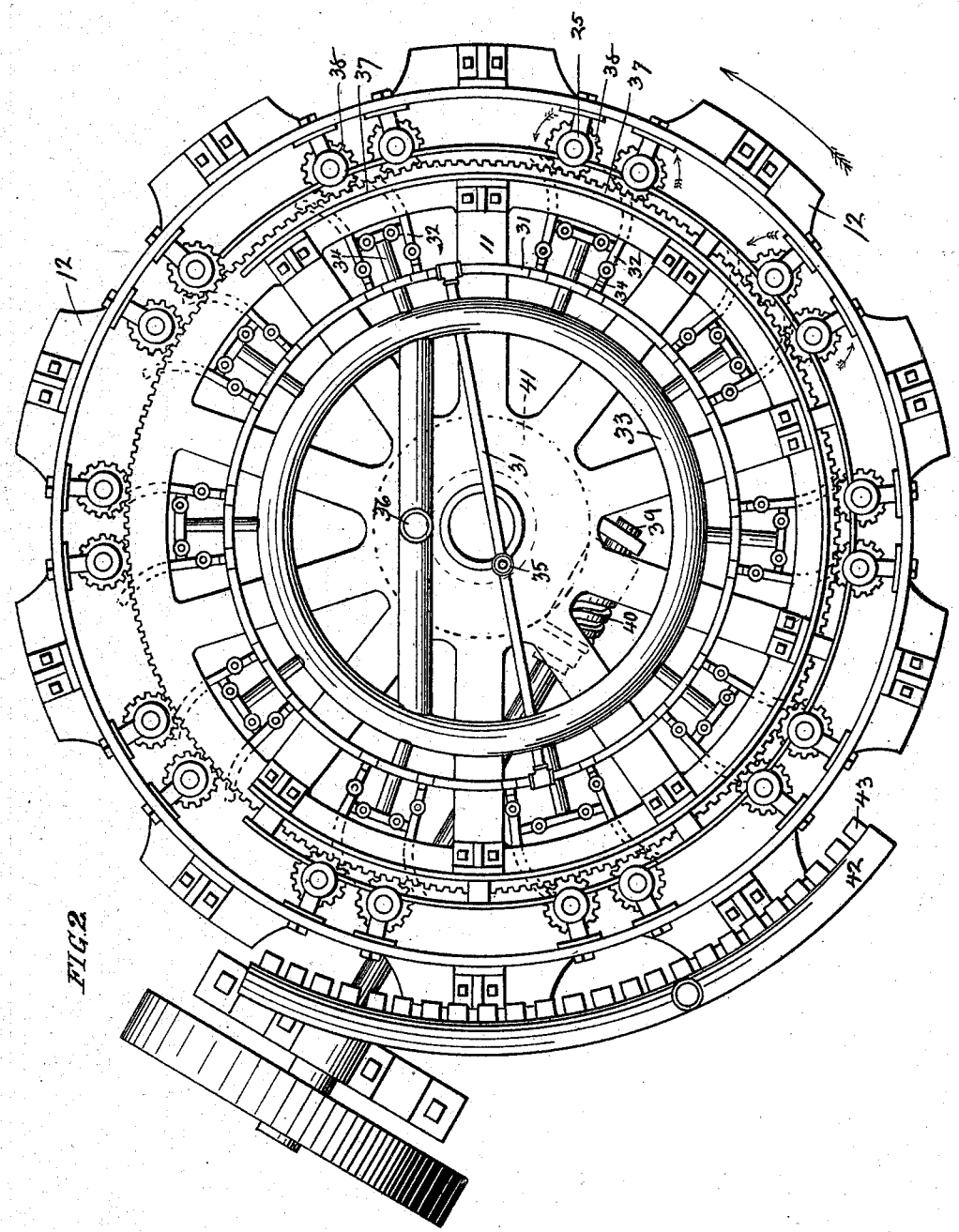
Figure 3:
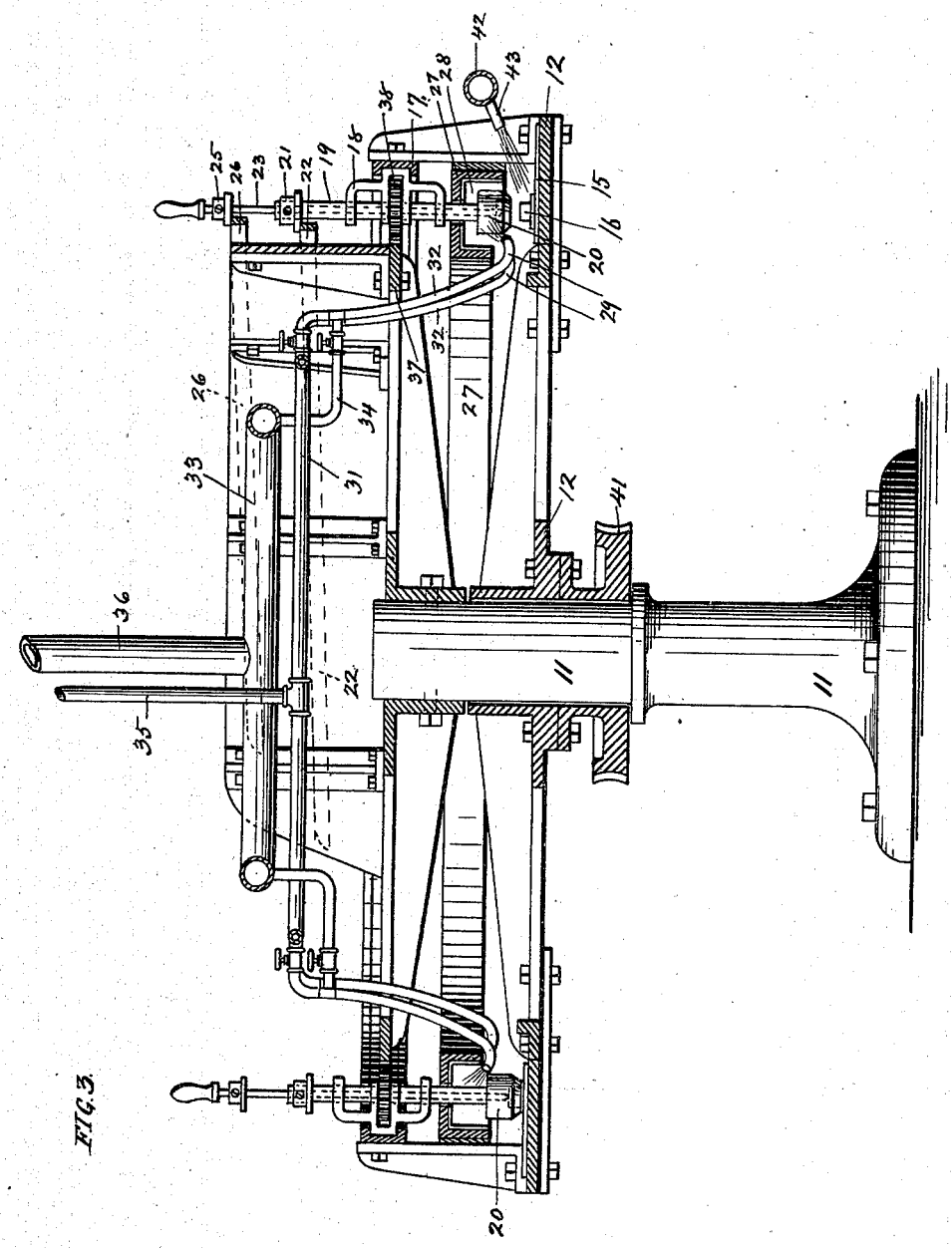
Figure 4:
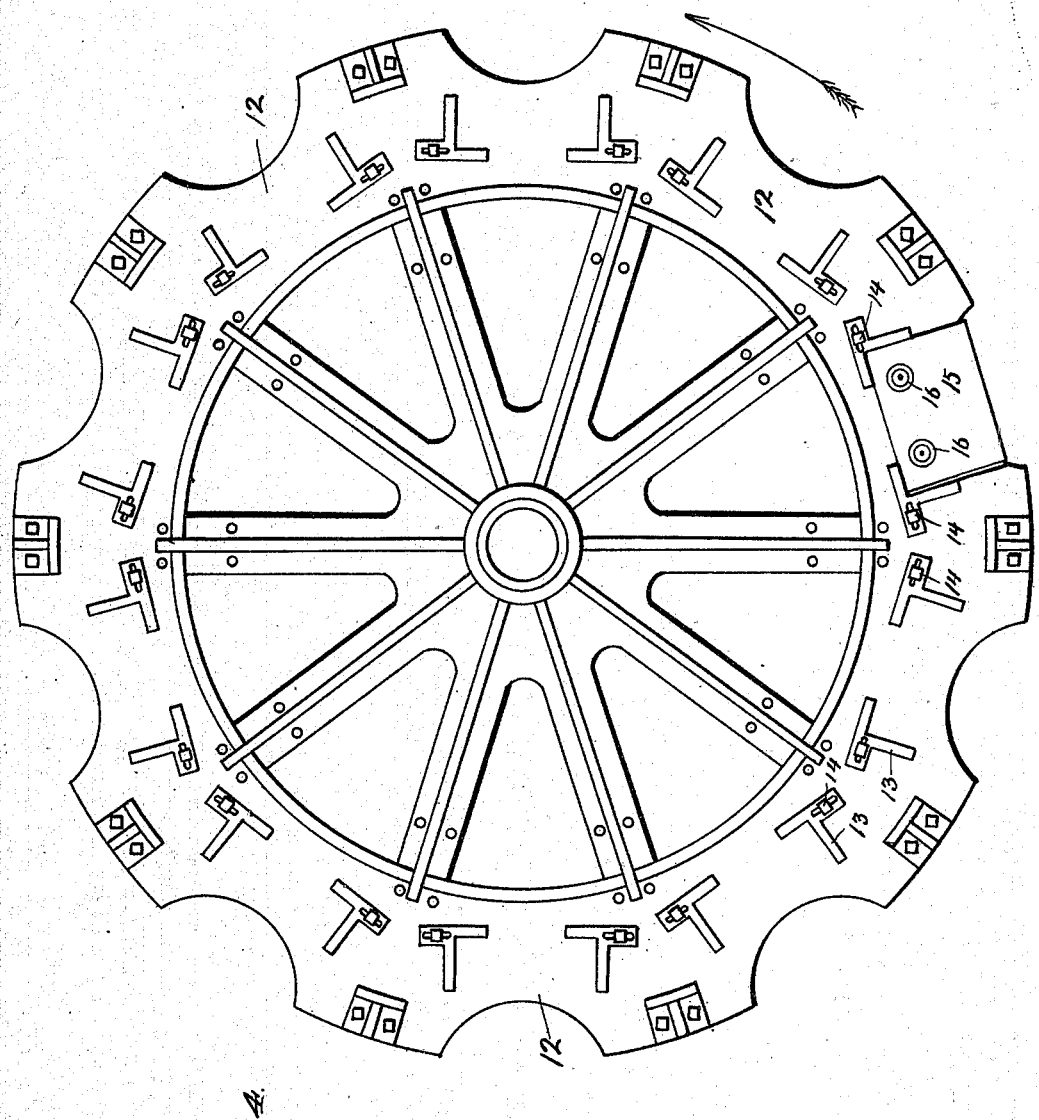

In the accompanying drawings, forming a part of this specification, Figure 1 is a side elevation of a bail-ear-soldering machine embodying the invention. Fig. 2 is a plan view. Fig. 3 is a central vertical section, and Fig. 4 is a detail view of the blank holder and carrier.

In the drawings, 11 represents the frame of the machine, the same preferably comprising an upright standard or shaft.

12 is a rotary carrier or table journaled to turn on the shaft or standard 11, furnished with a series of body-blank holders, each preferably consisting of a pair of angle-pieces adjustably secured to the carrier or table 12 by set-screws 14 and adapted to receive the flat body-blank 15 between them and hold the same in proper registry with the soldering-tools while the bail-ears 16 are being soldered to the blank 15. The rotary table 12 is provided with an upright ring 17, upon which are secured a series of brackets or bearings 18, in which are mounted or journaled the hollow shafts 19 of the rotary soldering-tools 20. Each of the hollow shafts 19 is furnished with a collar 21, which engages an inclined circular track or cam 22, which thus serves to automatically raise the soldering-tool, as required, as the carrier or table 12 turns or travels around. Inside each of the hollow shafts or sleeves 19 of the annular soldering-tools 20 is an ear holding or clamping rod 23, having a rounded end 24, which enters the eye or central hole of the bail-ear, and thus centers and holds the bail-ear in position while the rotary soldering-tool is operating upon the same to melt the ribbon-solder with which the edge of the bail-ear is hemmed before the body-blank and bail-ears are put in the machine. Each of the clamping or ear-holding rods 23 is furnished with a collar 25, which rides upon an inclined track or cam 26, secured to the stationary frame of the machine and by which the ear-holding rod is lifted, as required, at intervals to enable the can-body blanks and bail-ears to be placed in the machine and the same to be removed therefrom after the ears have been soldered in place. The rotating table 12 is further provided with a heater-ring 27, having an annular chamber 28, into which the soldering-tools are withdrawn when the same are lifted by its operating-cam 22. This heating-chamber is heated by a series of gas-burners 29, each of which is preferably furnished with an air-pipe 34, entering the gas-pipe 32, and the burner or gas-nozzle projecting slightly upward into the annular heating-chamber 28 and operating to project the flame against the soldering-tools as they travel around.

31 is an annular gas-supply pipe having branches 32 leading to each of the burners, and 33 is an annular air-supply pipe having branches 34 leading to each of the gas-projecting orifices or nozzles.

35 is the gas-feed pipe, and 36 the air-blast-feed pipe.

Secured to the upper end of the shaft or standard 11 is a stationary or non-revolving gear or toothed wheel 37, the teeth of which mesh with gears 38 on the hollow shafts 19 of the soldering-tools, thus causing the soldering-tools to be rotated as the carrier 12 revolves. The carrier 12 itself is rotated, as required, from the driving-shaft 39 through the worm 40 thereon, meshing with the worm-gear 41 on the rotary table or carrier 12.

After the soldering has been properly done by the operation of the soldering-tool the soldered seam is cooled, so as to set the solder, by a series of air-nozzles 42, connected to the air-blast pipe 43.

In operation the flat body-blank of the sheet-metal can, pail, or other vessel is placed in the holder 13 on the carrier 12, and then the two bail-ears 16 16, which are to be soldered to it, are put in position in the annular countersink, with which the body-blank is provided for this purpose, this being done at the high portion of the cam or tracks 22 and 26. As the carrier 12 revolves on its upright shaft the cam-clamping rod 23 is permitted by its cam 26 to move down upon the bail-ear by its own weight, and after the bail-ear is thus clamped or centered in position the rotary soldering-tool 20 is lowered into position for operation by the cam 22 and rotates in contact with the seam to be soldered. After the solder has been thoroughly fused and distributed or worked into the seam by the rotary action of the soldering-tool the inclined cam or track 22 lifts the soldering-tool from the work and the further movement of the carrier 12 conveys the work into position to be operated upon by the cooling-nozzles, which serve to set the solder so that the work may be removed from the machine when the carrier 12 conveys it around to the required position.

I claim—

1. In a machine for soldering bail-ears upon body-blanks of sheet-metal cans, pails or vessels, the combination with a rotary table or carrier furnished with a series of body-blank holders, and a series of rotating soldering-tools mounted on said table, substantially as specified.

2. In a machine for soldering bail-ears upon body-blanks of sheet-metal cans, pails or vessels, the combination with a rotary table or carrier furnished with a series of body-blank holders, a series of rotating soldering-tools mounted on said table, and a series of ear holding or clamping rods inside the soldering-tools, substantially as specified.

3. In a machine for soldering bail-ears upon body-blanks of sheet-metal cans, pails or vessels, the combination with a rotary table or carrier furnished with a series of body-blank holders, a series of rotating soldering-tools mounted on said table, a series of ear holding or clamping rods inside the soldering-tools, and inclined cams or tracks for raising and lowering said soldering-tools and ear-holding rods, substantially as specified.

4. In a machine for soldering bail-ears upon body-blanks of sheet-metal cans, pails or vessels, the combination with a rotary table or carrier furnished with a series of body-blank holders, a series of rotating soldering-tools mounted on said table, a series of ear holding or clamping rods inside the soldering-tool, inclined cams or tracks for raising and lowering said soldering-tools and ear-holding rods, a stationary gear, and gears on the shafts of said soldering-tools engaging said stationary gear, substantially as specified.

5. In a machine for soldering bail-ears upon body-blanks of sheet-metal cans, pails or vessels, the combination with a rotary table or carrier furnished with a series of body-blank holders, a series of rotating soldering-tools mounted on said table, a series of ear holding or clamping rods inside the soldering-tools, inclined cams or tracks for raising and lowering said soldering-tools and ear-holding rods, a stationary gear, gears on the shafts of said soldering-tools engaging said stationary gear, an annular heating-chamber, and a series of burners for heating said soldering-tools, substantially as specified.

6. In a machine for soldering bail-ears upon body-blanks of sheet-metal cans, pails or vessels, the combination with a rotary table or carrier furnished with a series of body-blank holders, a series of rotating soldering-tools mounted on said table, a series of ear holding or clamping rods inside the soldering-tools, inclined cams or tracks for raising and lowering said soldering-tools and ear-holding rods, a stationary gear, gears on the shafts of said soldering-tools engaging said stationary gear, an annular heating-chamber, a series of burners for heating said soldering-tools, and a cooling-pipe furnished with a series of nozzles for projecting blasts of air against the soldered seams, substantially as specified.

HORATIO N. NORTON.

Witnesses:
H. M. MUNDAY,
EDMUND ADCOCK.